March 14, 1939.  M. T. VOIGT  2,150,867

ADJUSTABLE BRAKE TRANSMISSION UNIT

Filed March 13, 1936

WITNESS:
Robt R Kitchel

INVENTOR
Max T. Voigt
BY
Augustus B. Stoughton.
ATTORNEY.

Patented Mar. 14, 1939

2,150,867

UNITED STATES PATENT OFFICE 2,150,867

ADJUSTABLE BRAKE TRANSMISSION UNIT

Max T. Voigt, Reading, Pa., assignor to American Safety Table Company, Inc., Reading, Pa., a corporation of Pennsylvania Application March 13, 1936, Serial No. 68,685

2 Claims. (Cl. 192—18)

My invention relates to transmission units, particularly those useful in connection with sewing-machines. My invention is illustrated in connection with a transmission unit of individual drive type but is useful in transmission units of the multiple drive type as well as with many other devices of this general character.

Transmission units of the present construction have brakes which are greatly subject to wear because of the frequency of starting and stopping these devices. This wear of the brake-shoe necessitates a greater travel of the treadle or other clutch-operating device and changes the point in the path of the treadle or other operating device at which the brake becomes operative, thereby rendering constant care on the part of the operator necessary to locate the exact point at which the needle of the sewing-machine will be stopped. This is an undesirable strain and imposes the necessity of skill on the part of the operator. My invention includes the provision of means for adjusting the brake-shoe to take up the wear so that the point in the path of travel of the treadle or other operating member at which the brake becomes operative remains the same, thereby enabling the operator to stop the sewing-machine needle at the same point and with greater accuracy.

More specifically, my invention comprises a transmission unit having a brake-shoe adjustably mounted on a stationary part of the transmission unit and having readily detached means for locking said brake-shoe in each of its adjusted positions.

For a further exposition of my invention, reference is made to the annexed drawing and specification at the end whereof the novel features of my invention will be pointed out and claimed.

Figure 1:
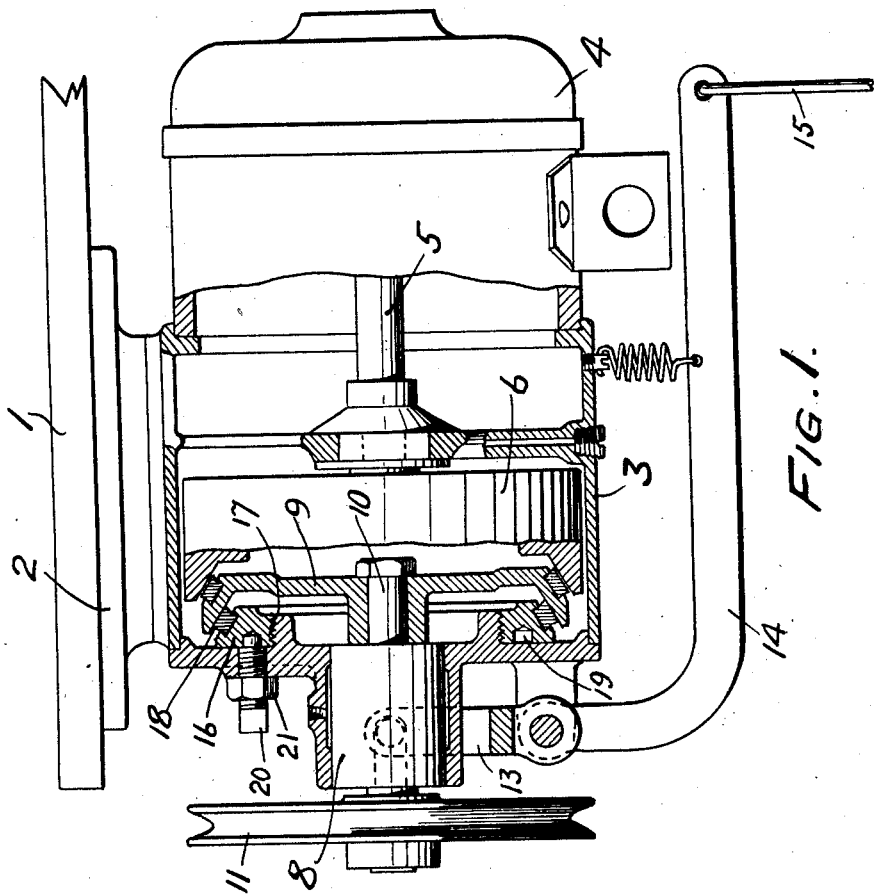
Fig. 1 is a side elevation of my device, with the parts shown in vertical cross-section.
Figure 2:
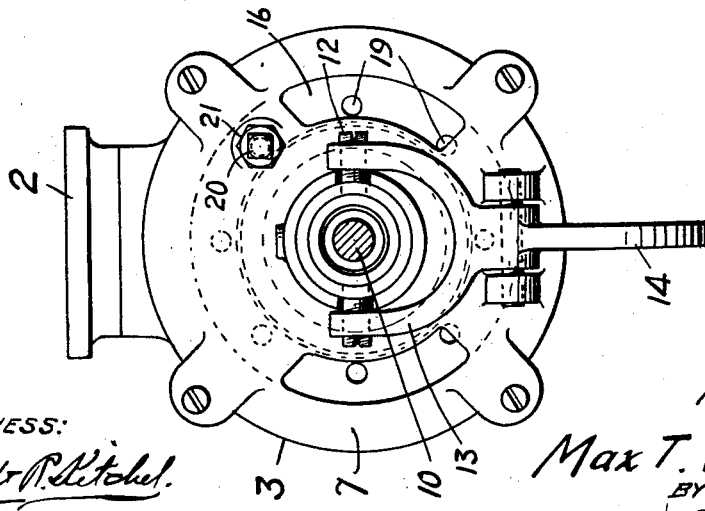
Fig. 2 is an end view, with parts broken away in transverse cross-section.

In that embodiment of my invention chosen from amongst others for illustration in the drawing and description in the specification, my device is shown as being suitable for attachment to a table 1 or other device by means of a bracket 2 or other support which forms a part of a drum or similar element 3 forming a part of the housing. To one end of drum 3 is mounted a motor 4, shown as an electric motor but which may be of any convenient type. Motor 4 has a shaft 5 to which is attached a clutch-driving member 6.

The opposite end of drum 3 from that on which motor 4 is mounted bears an end plate 7 having an opening in which is slidably mounted a sleeve 8, which provides a slidable bearing for driven clutch member 9 which is mounted on shaft 10, to which is also attached a pulley 11 by means of which the sewing-machine or like device is driven. Sleeve 8 bears screws 12 or like devices thereon, by means of which yoke 13 is connected to arm 14 and thence to link 15 which is connected to a foot-treadle or similar operating device.

On end plate 7 is mounted a support 16 which conveniently takes the form of an annular ring having engagement with end plate 7 by means of screw-threads 17. Support 16 carries brake-shoe 18 on its face opposite clutch-driven member 9.

In its rear, support 16 carries a plurality of bores 19. End plate 7 carries a locking-screw which has screw-threaded engagement therewith. Locking-nut 21 retains locking-screw 20 in position. The end of locking-screw 20 enters into one of the bores 19 in support 16 and thereby retains the support 16 and consequently brake-shoe 18 in position.

The operation of my device is as follows: When it is desired to adjust the position of brake-shoe 18 to take up for wear, locking-nut 21 is loosened and locking-screw 20 is backed off so that it clears the bore 19 which it previously occupied. Support 16 is then rotated on screw-threads 17 until another bore is aligned with the end of locking-screw 20. Locking-screw 20 is then screwed forward so that its end enters the bore 19 and locks it in its adjusted position. Locking-nut 21 is then screwed up to retain locking-screw 20 in position.

I do not intend to be limited save as the scope of the prior art and of the attached claims may require.

I claim:

1. In a transmission unit, a stationary member having screw-threads thereon, an annular support having screw-threads for co-operation with said screw-threads on said stationary member, a brake-shoe carried by said support, said support being provided with a plurality of bores arranged in a ring and facing said stationary member, said stationary member being provided with a screw-threaded hole therethrough located so that each of said bores in said support may be aligned therewith by rotating said support, and a locking-screw co-operating with said screw-threaded hole in said stationary member and having an end adapted to enter one of said bores in said support and to thereby lock said support against movement relative to said stationary member.

2. In a transmission unit, the combination of, a housing having end plates, a clutch element mounted in one of said end plates for rotary and translatory movement relative thereto, a brake element mounted on said housing adjacent said clutch element so as to engage said clutch element at one end of its translatory movement, adjusting means provided between said end plate carrying said clutch member and said brake element, and locking means separate from said adjusting means provided between said end plate and said brake element to lock said brake element in various adjusted positions, said end plate having openings therein which expose said brake element for adjustment.

MAX T. VOIGT.